United States Patent
Akpata

(10) Patent No.: US 10,595,663 B2
(45) Date of Patent: Mar. 24, 2020

(54) EDO CUP 2.0

(71) Applicant: Reginald Osagie Akpata, Old Greenwich, CT (US)

(72) Inventor: Reginald Osagie Akpata, Old Greenwich, CT (US)

(73) Assignee: Reginald Osagie Akpata, Old Greenwich, CT (US)

( * ) Notice: Subject to any disclaimer, the term of this patent is extended or adjusted under 35 U.S.C. 154(b) by 91 days.

(21) Appl. No.: 15/976,685

(22) Filed: May 10, 2018

(65) Prior Publication Data

US 2019/0343322 A1 Nov. 14, 2019

(51) Int. Cl.
*A47J 31/06* (2006.01)
*B01D 29/01* (2006.01)
*B01D 29/03* (2006.01)
*B01D 39/16* (2006.01)

(52) U.S. Cl.
CPC ....... *A47J 31/0636* (2013.01); *A47J 31/0626* (2013.01); *B01D 29/012* (2013.01); *B01D 29/016* (2013.01); *B01D 29/031* (2013.01); *B01D 39/1615* (2013.01)

(58) Field of Classification Search
CPC .... A47J 31/0636; A47J 31/0626; A47J 31/06; A47J 31/005; A47J 31/446; A47J 31/0631; B01D 29/016; B01D 24/20; B01D 23/02; B01D 23/08; B01D 24/00; B01D 24/205; B01D 24/22; B01D 29/01; B01D 29/012; B01D 29/014; B01D 29/03; B01D 29/031; B01D 29/035; B01D 29/05; B01D 29/07; B01D 29/071; B01D 39/16; B01D 39/1607; B01D 39/1615; B01D 39/1669; B01D 39/2055
USPC ......... 99/279, 295, 304, 306, 307, 316, 317, 99/321–323; 210/470, 473, 474, 464, 210/465, 482; 426/77–80, 82, 84, 433
See application file for complete search history.

(56) References Cited

U.S. PATENT DOCUMENTS

| | | | | |
|---|---|---|---|---|
| 2,287,648 | A * | 6/1942 | Sunderhauf | B65D 5/02 229/120.14 |
| 3,246,457 | A * | 4/1966 | De Baun | B01D 46/10 55/499 |
| 3,971,305 | A * | 7/1976 | Daswick | A47J 31/02 99/295 |
| 4,094,234 | A * | 6/1978 | Olney | A47J 31/08 99/310 |
| 4,715,271 | A * | 12/1987 | Kitagawa | B65D 85/8043 210/474 |
| 5,059,325 | A * | 10/1991 | Iida | A47J 31/02 210/474 |
| 5,605,710 | A * | 2/1997 | Pridonoff | A47J 31/02 206/0.5 |
| 5,771,777 | A * | 6/1998 | Davis | A47J 31/02 99/279 |
| 6,079,318 | A * | 6/2000 | Davis | A47J 31/005 99/279 |

(Continued)

*Primary Examiner* — Joseph W Drodge

(57) ABSTRACT

The Edo Cup 2.0 is an open, suspended, accordion type paper single cup finable completely biodegradable and recycle-able beverage disposable filter.
The filter can be in several shapes and sizes and may display corporate logs, up to an including religious symbols, sayings and holiday messages.
The filter may enclose flavors (in the filter paper) or be pre-soaked in flavors prior to packaging for sale.

3 Claims, 7 Drawing Sheets

(56) References Cited

U.S. PATENT DOCUMENTS

| | | | | |
|---|---|---|---|---|
| 7,235,272 | B2* | 6/2007 | Saitoh | A47J 31/02 |
| | | | | 426/82 |
| 8,746,131 | B2* | 6/2014 | Saitoh | A47J 31/005 |
| | | | | 210/474 |
| 9,282,847 | B2* | 3/2016 | Akpata | A47J 31/0636 |
| 2004/0222147 | A1* | 11/2004 | Post | A47J 31/02 |
| | | | | 210/493.1 |
| 2005/0279220 | A1* | 12/2005 | Cheng | A47G 19/22 |
| | | | | 99/323 |
| 2007/0071965 | A1* | 3/2007 | Ramsey | D21H 17/39 |
| | | | | 428/329 |
| 2007/0151460 | A1* | 7/2007 | Beck | A47J 31/08 |
| | | | | 99/279 |
| 2008/0264268 | A1* | 10/2008 | Tjen | A47J 31/02 |
| | | | | 99/323 |
| 2009/0004351 | A1* | 1/2009 | Maurer | A47J 31/0631 |
| | | | | 426/433 |
| 2014/0339151 | A1* | 11/2014 | Llach Villalobos | |
| | | | | A47J 31/0636 |
| | | | | 210/470 |
| 2017/0121065 | A1* | 5/2017 | Nguyen | A47J 31/02 |

* cited by examiner

EDO CUP 2.0

CROSS-REFERENCE TO RELATED APPLICATIONS

U.S. Pat. No. 9,282,847

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

The Edo cup 2.0 is a disposable and biodegradable beverage device that solves the problem encountered in brewing hot or cold brewed fresh ground coffee without using a non-disposable device in assistance. The Edo Cup device becomes key in the following situations:
1. Military officers on a mission where they can only carry light loads and must not—for safety sake leave behind evidence having been there.
2. Students in a dormitory where coffee percolators or other electronic devices cannot be used.
3. Victims of natural disasters who are confined to places where electronic devices are un-available, but are availed of hot water from a thermos.
4. Campers keen to enjoy fresh coffee while camping but keen not to leave behind trash for feral animals, can use the Edo Cup 2.0 and convey it to a safe disposal area to be discarded; or, since it is biodegradable they may submit it for recycling

BRIEF SUMMARY OF THE INVENTION

Figure 1:
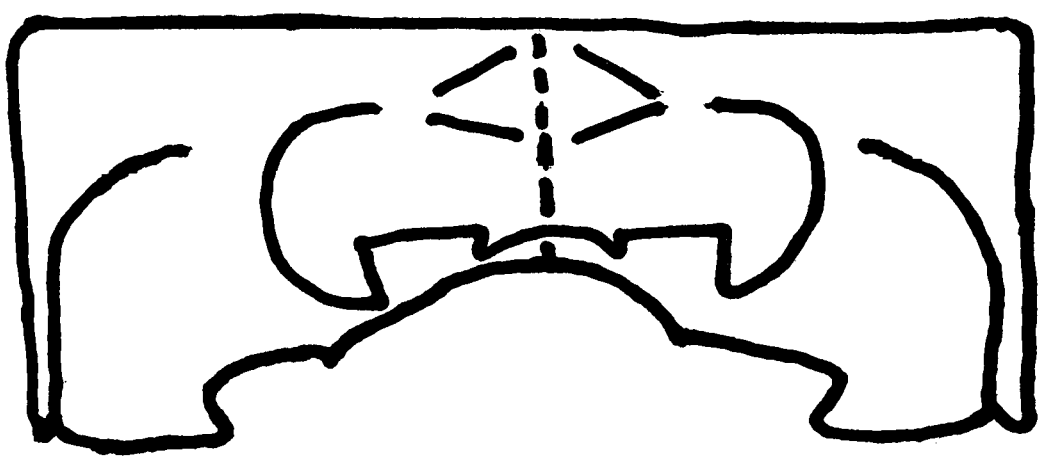
FIG. 1 Depicts a die cut chipboard tag (0.22, or heavier), with full strategic die cuts FIG. 2 Shows the die cut tag placed on top of a pre cut sheet of coffee filter paper FIG. 3 Depicts the machine stitched sewing pattern using organic biodegradable cotton, used to adhere the die cut tag to the filter paper FIG. 4 Shows the now adhered tag and filter folded in half, and then a straight stitch using organic cotton is sewn across the bottom of the filter paper FIG. 5 Shows the initial deployment of the two "wings on each side of the tag FIG. 6 Depicts the fully deployed tag, its conical shape and conical vortex that will assist in the efficacious brewing process FIG. 7 Shows the fully deployed brew filter placed on a Cup ready to receive fine ground coffee and applications of hot or cold water until the beverage fills the cup; at that point the brew filter and the coffee grounds are submitted for recycling and the beverage is ready to drink
Figure 2:
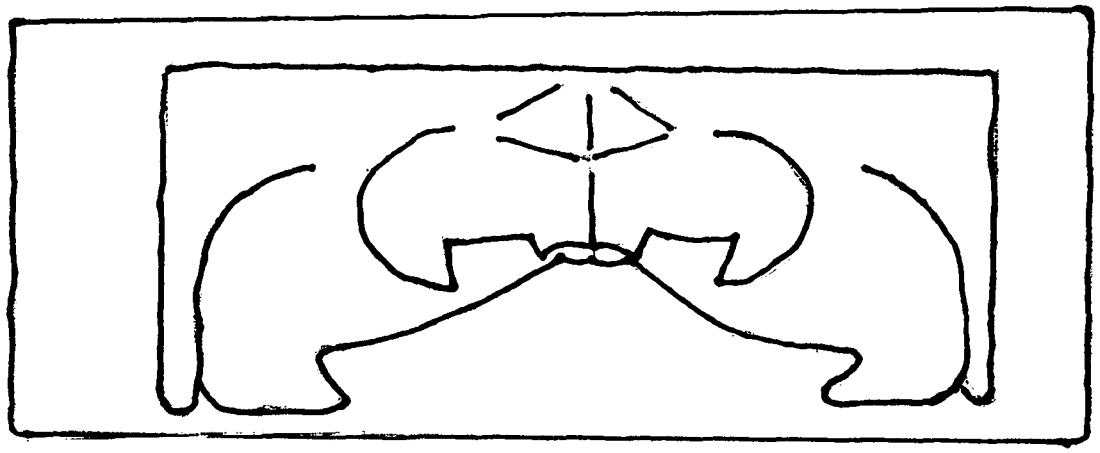
Figure 3:
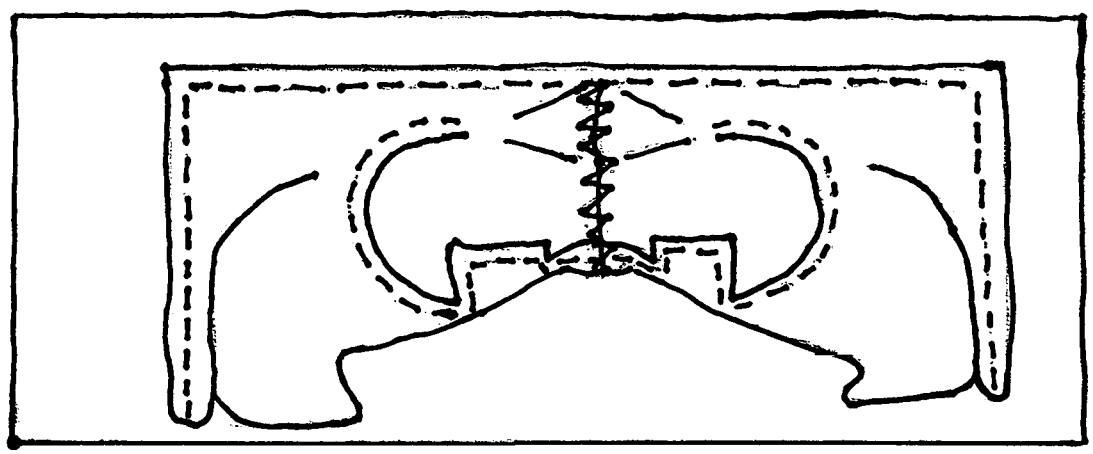

The Edo cup 2.0 enables the user to use a completely disposable and biodegradable filter to brew a hot or cold beverage, then discard the filter and beverage components as completely biodegradable matter.

Its conical shape with fluted pour over area makes it significantly different from like devices listed in the patent registry, at once new, but ancient—when at use—in the mimicry of the ancient art of brewing coffee through a filter.

Daswick U.S. Pat. No. 3,971,305 comes closest in understanding that efficacy in the extraction lies in a large pour over area and a conical vortex. Because of the conical shape of the filter and its inverted vortex, it is advantageous to imbibing such a quality of beverage such as competition scored and cupped Specialty Coffee.

Specialty Coffee as defined by the global Specialty Coffee Association (SCA), is: Coffee cupped and scored by a trained and certified coffee Q-Coffee-grader at a score of 85 or greater over a possible score of 100, using the prescribed (SCA) coffee cupping sheet.

The EdoCup 2.0 contains features that will make it more acceptable to the specialty coffee and other specialty beverage industries. Its construction with a vast fluted area over which liquid can be poured and then drained into a single conical vortex will ensure its adoption in the specialty beverage industry for its efficacy.

Also the version 2.0 is an improvement on the original Edo Cup because it's advanced construction ensures that it is made entirely of 100% biodegradable components.

Edo Cup 2.0 Classifications:

A47J31/0636 Filters or strainers for coffee or tea makers; Holders therefor suspended from the top of the beverage container so as to remain in contact with the prepared infusion A47J31/0626 Filters or strainers for coffee or tea makers; Holders therefor with means for securing the filter holder to the beverage container B01D24/20 Filters comprising loose filtering material, i.e. filtering material without any binder between the individual particles or fibres thereof with the filter bed stationary during the filtration the filtering material being provided in an open container B01D29/016 Other filters with filtering elements stationary during filtration, e.g. pressure or suction filters, or filtering elements therefor with flat filtering elements with corrugated, folded or wound filtering elements

DETAILED DESCRIPTION OF THE INVENTION

"Edo Cup 2.0":—cup, open, suspended, accordion type, paper and die cut chipboard, single cup, fillable beverage disposable filter.

Specifically from FIGS. 1 through 7, a disposable drip coffee beverage (or otherwise) device, comprising a die-cut and die-scored chipboard card tag forming a conical accordion suspension device consisting of a porous beverage filter adhered to a chipboard support.

The combination of the two elements sewn together provide a construct where a completely biodegradable vessel is arranged to sit atop a single beverage cup or flask. The resulting constructed beverage filter is a disposable conical filter which when deployed forms a conically shaped vessel that meets exacting brewing standards.

The die cut comprises of a pair of "wings on each side of the folded brew filter, and the scoring comprises a pair of straight crease scores, which extend inwardly from opposite sides enabling the deployed brew filter to stay in its deployed mode.

The paper portion of the brew filter is made of filter paper that can be pre-soaked with a flavoring or can enclose one or more flavorants.

Figure 4:
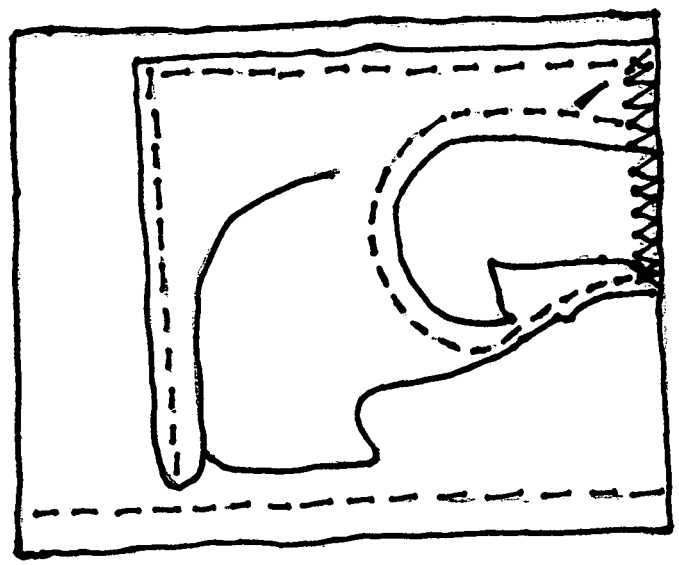
Figure 5:
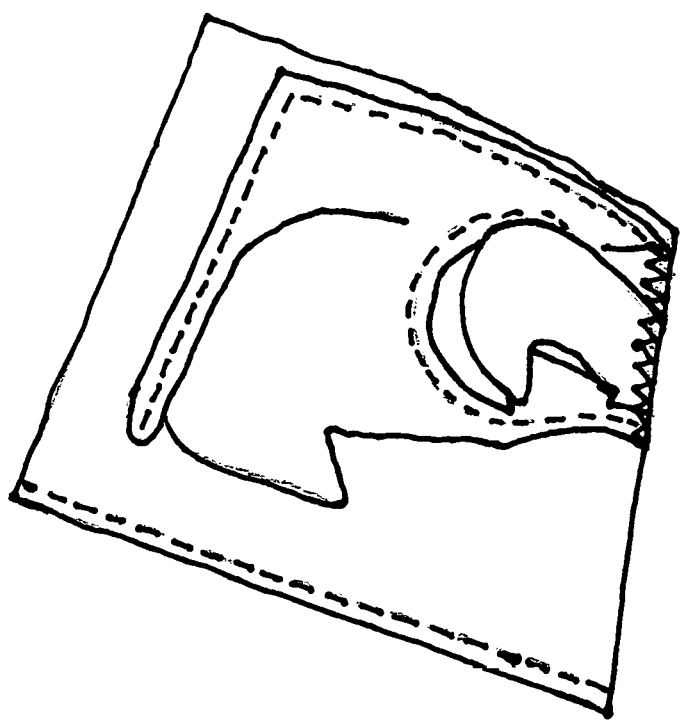
Figure 6:
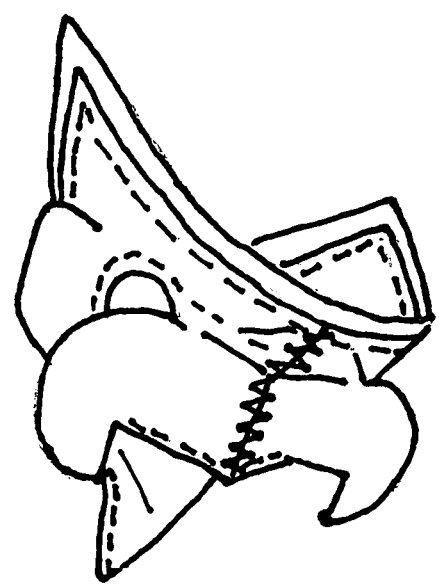
Figure 7:
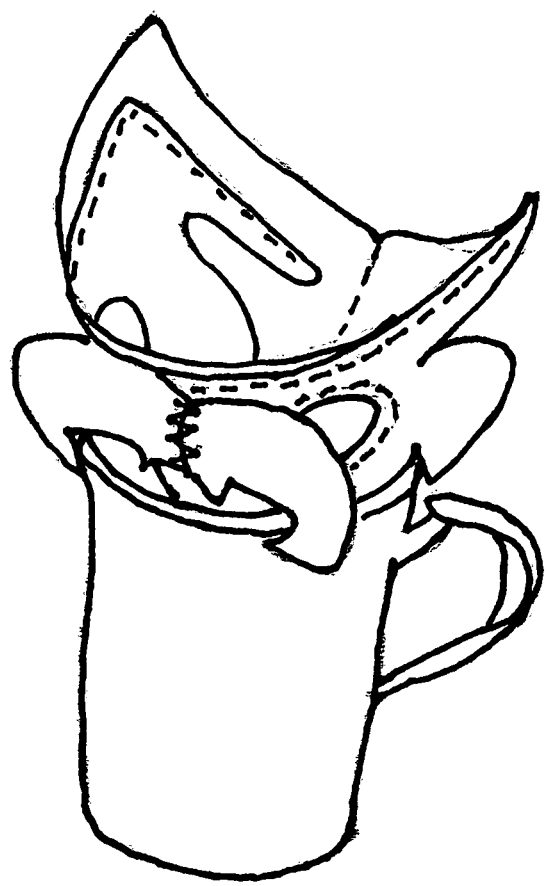

The chipboard tag portion of the disposable drip beverage device may display on its sides: corporate logos; up to and including religious symbols; sayings; and holiday messages. Filter may enclose flavors (in the filter paper) or be pre-soaked in flavors prior to packaging for sale. FIGS. 1 and 4 show the Edo Cup 2.0 and its construction, FIGS. 5 through 7 show the functionality from the deployment process in 4 to its fully deployed state in FIG. 7 where the filter is then placed on the vessel to receive the beverage, wings attached as vessel supports.

Beverage elements such as fresh ground coffee are then added to the vessel; boiling water is then poured on top of the elements to create the beverage. At the conclusion of the brew process the brew elements such as coffee grounds are then discarded along with the used filter paper ina biodegradable products receptor as every element from the chipboard to the paper to the organically grown thread used to sew the cup are all fully biodegradable.

The invention known as the Edo Cup 2.0 is an invention in the USPTO Category of Class 99 beverage devices.

The invention known as the Edo Cup 2.0 is another device that solves the problem encountered in brewing fresh ground coffee in a disposable filter without using any non-disposable device as an assistant. See: U.S. Pat. No. 7,235,272, Saltoh et al. FIG. 7 shows the EdoCup suspended, ready to be filled by coffee grounds or tea and then hot or cold water.

Edo Cup 2.0

NON-PATENT CITATIONS (1)

Title

Reginald Akpata (BarBeachBoy), # EdoCup, Instagram, Published Oct. 1, 2014 at Huntington Beach High School, Pool Deck, 1905 Main Street, Huntington Beach, Calif., USA Edo Cup 2.0

SIMILAR DOCUMENTS

Publication Publication Title

Date

U.S. Pat. No. 2,728,671A 1955 Dec. 27 Porous container of a dry infusion commodity and cover combination
U.S. Pat. No. 5,842,408A 1998 Dec. 1 Coffee brewing package unit
U.S. Pat. No. 1,778,175A 1930 Oct. 14 Metallic receptacle
U.S. Pat. No. 4,715,271A 1987 Dec. 29 Disposable beverage brewer
WO2009110783A2 2009 Sep. 11 System, method and capsule for preparing a beverage
U.S. Pat. No. 3,695,167A 1972 Oct. 3 Filter for filtering coffee
U.S. Pat. No. 3,344,734A 1967 Oct. 3 Individual coffee extractor with controlled extracting time
U.S. Pat. No. 2,483,985A 1949 Oct. 4 Squeezer for tea bags
U.S. Pat. No. 2,805,164A 1957 Sep. 3 Coffee packaging and preparing device
U.S. Pat. No. 5,885,633A 1999 Mar. 23 Flavor/supplement enhancing filter and method of forming and using same
US20150166257A1 2015-06-18 Capsule with Sensory Attributes
USD722498S1 2015 Feb. 17 Lid for a beverage container
US20050247207A1 2005 Nov. 10 Drink infusion device having a submersible element; a buoyant retrieval element
WO2010016753A1 2010 Feb. 11 System, method and capsule for preparing a beverage
U.S. Pat. No. 1,473,430A 1923 Nov. 6 Tea cartridge
U.S. Pat. No. 2,517,115A 1950 Aug. 1 Crossword puzzle book
USD733554S1 2015 Jul. 7 Capsule for hot or cold beverages
U.S. Pat. No. 1,585,524A 1926 May 18 Convertible liquid container
U.S. Pat. No. 3,252,403A 1966 May 24 Coffee filter
USD692713S1 2013 Nov. 5 Coffee brewer
U.S. Pat. No. 2,335,198A 1943 Nov. 23 Container for food and cover therefor
CN2727099Y 2005 Sep. 21 Portable and easily infused cup and bowl
US20140251152A1 2014 Sep. 11 Beverage container suitable for making cold or hot beverage
WO2010139575A1 2010 Dec. 9 Rigid cartridge for coffee and soluble products for preparing beverages
U.S. Pat. No. 1,612,450A 1926 Dec. 28 Strainer mechanism

PATENT CITATIONS

U.S. Pat. No. 2,728,671A 1955 Dec. 27 Porous container of a dry infusion commodity and cover combination
US582408A 1998 Dec. 1 Coffee brewing package unit
U.S. Pat. No. 1,778,175A 1930 Oct. 14 Metallic Receptacle
U.S. Pat. No. 4,715,271A 1987 Dec. 29 Disposable beverage brewer
WO2009010783A2 2009 Sep. 11 System, method and capsule for preparing a beverage
U.S. Pat. No. 3,695,167A 1972 Oct. 3 Filter for filtering coffee
U.S. Pat. No. 3,344,734A 1967 Oct. 4 Squeezer for tea bags
U.S. Pat. No. 2,805,164A 1957 Sep. 3 Coffee packaging and preparing device
U.S. Pat. No. 5,885,633A 1999 Mar. 23 Flavor/supplement enhancing filter and method of forming and using same
US20150166257A1 2015 Feb. 17 Lid for a beverage container
US2005024207A1 2005 Nov. 10 Drink infusion device having a submersible element and a buoyant retrievable element
WO2010016753A1 2010 Feb. 11 System, method and capsule for preparing a beverage
U.S. Pat. No. 1,473,430A 1923 Nov. 6 Tea cartridge
USD733554S1 2015 Jul. 7 Capsule for hot or cold beverages
U.S. Pat. No. 1,585,524A 1926 May 18 Convertible liquid container
U.S. Pat. No. 3,252,403A 1966 May 24 Coffee filter USD692713S1 2013 Nov. 5 Coffee Brewer
U.S. Pat. No. 2,335,198A 1943 Nov. 23 Container for food and cover therefor
CN2727099Y 2005 Sep. 21 Portable and easily infused cup and bowl
US20140251152A1 2014 Sep. 11 Beverage container suitable for making cold or hot beverage
WO2010139575A1 2010 Dec. 9 Rigid cartridge for coffee and soluble products for preparing beverages
U.S. Pat. No. 1,612,450A 1926 Dec. 28 Strainer mechanism
U.S. Pat. No. 2,822,273A 1958 Feb. 4 Beverage maker
U.S. Pat. No. 2,728,671A 1955 Dec. 27 Porous container of a thy infusion commodity and cover combination
U.S. Pat. No. 5,842,408A 1998 Dec. 1 Coffee brewing package unit
U.S. Pat. No. 1,778,175A 1930 Oct. 14 Metallic receptacle
U.S. Pat. No. 4,715,271A 1987 Dec. 29 Disposable beverage brewer
U.S. Pat. No. 3,344,734A 1967 Oct. 3 Individual coffee extractor with controlled extracting time
U.S. Pat. No. 1,858,435A 1932 May 17 Combination citrous fruit squeezer and food holder
U.S. Pat. No. 2,483,985A 1949 Oct. 4 Squeezer for tea bags
US20150166257A1 2015-06-18 Capsule with Sensory Attributes
U.S. Pat. No. 5,885,633A 1999 Mar. 23 Flavor/supplement enhancing filter and method of forming and using same
USD722498S1 2015 Feb. 17 Lid for a beverage container
WO2010016753A1 2010 Feb. 11 System, method and capsule for preparing a beverage
EP2228320A1 2010 Sep. 15 System, method and capsule for preparing a beverage
U.S. Pat. No. 2,517,115A 1950 Aug. 1 Crossword puzzle book
U.S. Pat. No. 2,335,198A 1943 Nov. 23 Container for food and cover therefor
WO2010139575A1 2010 Dec. 9 Rigid cartridge for coffee and soluble products for preparing beverages
U.S. Pat. No. 1,585,524A 1926 May 18 Convertible liquid container
USD692713S1 2013 Nov. 5 Coffee brewer
US20140251152A1 2014 Sep. 11 Beverage container suitable for making cold or hot beverage
CN2727099Y 2005 Sep. 21 Portable and easily infused cup and bowl
U.S. Pat. No. 1,489,807A 1924 Apr. 8 Receptacle
U.S. Pat. No. 1,612,450A 1926 Dec. 28 Strainer mechanism
US20140042217A1 2014-02-13 Drink Cup for Road Running Races
U.S. Pat. No. 3,360,132A 1967 Dec. 26 Coffee filter element
U.S. Pat. No. 1,589,486A 1926 Jun. 22 Safety drainer

The invention claimed is:

1. A completely biodegradable, disposable drip beverage device comprising of: a die-cut and die-scored paper card forming a conical accordion biodegradable porous beverage filter attached by sewn organic thread to a die cut chipboard tag; said chipboard tag constructed and arranged to outwardly display one or more of logos, symbols or messages on its sides, said filter being constructed and arranged to sit atop a single beverage cup or vase; wherein the beverage device is a disposable conical filter which when deployed forms a conically shaped vessel for brewing coffee, wherein the die scoring forms a pair of wings on each side of the filter over the cup or vase into which the brewed coffee will flow, with each wing extending outward from opposite sides of the device to provide support for the device on top of the cup or vase, and wherein the die cut chipboard tag and the porous beverage brewing filter together create a completely biodegradable and recyclable vessel.

2. The device of claim 1, wherein the filter comprises filter paper pre-soaked in flavor.

3. The device of claim 1, wherein the filter encloses one or more flavors.

\* \* \* \* \*